US006298135B1

United States Patent
Messerges et al.

(10) Patent No.: US 6,298,135 B1
(45) Date of Patent: Oct. 2, 2001

(54) METHOD OF PREVENTING POWER ANALYSIS ATTACKS ON MICROELECTRONIC ASSEMBLIES

(75) Inventors: Thomas S. Messerges, Schaumburg; Ezzat A. Dabbish, Cary, both of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/302,096

(22) Filed: Apr. 29, 1999

(51) Int. Cl.$^7$ ................................................. H04L 9/00
(52) U.S. Cl. ................................................. 380/1; 708/491
(58) Field of Search .................... 380/1; 708/491

(56) References Cited

U.S. PATENT DOCUMENTS

| | | |
|---|---|---|
| 5,742,530 | 4/1998 | Gressel et al. . |
| 5,745,398 | 4/1998 | Monier . |
| 5,991,415 * | 11/1999 | Shamir ................................... 380/30 |
| 5,995,629 * | 11/1999 | Reiner ...................................... 380/1 |

FOREIGN PATENT DOCUMENTS

WO99/35782   7/1999   (WO) .

OTHER PUBLICATIONS

Wayner. "Code Breaker Cracks Smart Card's Digital Safe". The New York Times. Jun. 22, 1998. pp. 1–5.*
Kocher et al. "Differential Power Analysis". Advances in Cryptology: Proceedings of CRYPTO '99. Springer–Verlag. Aug. 1999. pp. 388–397.*
Kocher et al. "Introduction to Differential Power Analysis and Related Attacks". Cryptology Research, Inc. 1998. pp. 1–7.*
Anderson et al. "Tamper Resistance–a Cautionary Note". The Second USENIX Workshop on Electronic Commerce Proceedings.Nov. 1996. pp. 1–11.*
Biham et al. "Differential Fault Analysis of Secret Key Cryptosystems". Advances in Cryptology: Proceedings of CRYPTO '97. Springer–Verlag. Aug. 1997. pp. 513–525.*
Anderson et al. "Low Cost Attacks on Tamper Resistant Devices". Security Protocol Workshop. Apr. 1997.*
Kocher et al. "Timing Attacks on Implementations of Diffie–Hellman, RSA, DSS, and Other Systems". Advances in Cryptology: Proceedings of CRYPTO '96. Springer–Verlag. Aug. 1996. pp. 104–113.*
Messerges et al. "Investigation of Power Analysis Attacks on Smartcards". pp. 1–14.*

* cited by examiner

*Primary Examiner*—Gail Hayes
*Assistant Examiner*—Anthony DiLorenzo
(74) *Attorney, Agent, or Firm*—K. Cyrus Khosravi; Terri S. Hughes

(57) ABSTRACT

Apparatus in form of a microelectronic assembly including an integrated circuit (IC) for execution of an embedded modular exponentiation program utilizing a square-and-multiply algorithm, wherein in the modular exponentiation program a secret exponent having a plurality of bits characterizes a private key, a method of providing a digital signature to prevent the detection of the secret exponent when monitoring power variations during the IC execution, the method comprising the steps of for a first operation in the modular exponentiation, selecting at least one predetermined bit, wherein the at least one predetermined bit is a bit other than a least significant bit (LSB) and the most significant bit (MSB); using the square-and-multiply algorithm, sequentially selecting bits to the left of the at least one predetermined bit for exponentiation until the MSB is selected; subsequent to selecting the MSB, sequentially selecting bits to the right of the at least one predetermined bit for exponentiation until the LSB is selected.

20 Claims, 8 Drawing Sheets

METHOD OF PREVENTING POWER ANALYSIS ATTACKS ON MICROELECTRONIC ASSEMBLIES

FIELD OF THE INVENTION

The present invention relates generally to microelectronic assemblies, and more particularly, to smartcards and the like and methods for preventing security breach of the same when a power analysis attack is used.

BACKGROUND OF THE INVENTION

Present implementations of cryptographic algorithms implemented in tamper-resistant hardware, such as a smartcard, and certain smartcard microcontrollers, are vulnerable to specific kinds of attacks. For example, when an encryption algorithm is run in software or hardware in a microcontroller, close observation and monitoring of the microcontroller's power consumption has been shown to be correlated to the data being operated on. It has further been shown that such correlated information can then be used to enable recovery of, for example, cryptographic key information stored or processed by the microcontroller.

The information revealed by the power consumption can today be monitored in various ways, ranging from simple techniques, such as simple power analysis (SPA), to more complex techniques, such as differential power analysis (DPA). These attacks are described in greater detail in a technical information bulletin, titled "Introduction to Differential Power Analysis and Related Attacks", by Paul Kocher, et al., of Cryptography Research, San Francisco, Calif., copyright 1998, reprinted at web site: www.cryptography.com.

In a typical smartcard system, the private-key for a public-key cryptosystem will be stored in a smartcard. A smartcard contains a microprocessor that is designed to be a tamper-resistant device. A smartcard's microprocessor is intended to be capable of storing the private key in such a manner as to prevent a malicious attacker from tampering with the smartcard and learning the value of this private key. However, power consumption information of a smartcard can be monitored by a malicious attacker to learn the bits of this private-key, thus breaching the security of the smartcard.

A smartcard is often used to digitally "sign" a random message as a proof of identity. This scheme is often referred to as an authentication algorithm and is used to ensure knowledge of a private key. In a popular authentication algorithm known as RSA, a smartcard contains a secret exponent E that is used as the private key. In order to determine if a smartcard is authentic, the smartcard is asked to raise A to the power of E and reduce the result by a modulus N. This mathematical operation is referred to as modular exponentiation. The notation for modular exponentiation is given in the following equation, where B is the result of the modular exponentiation and is referred to as the digital signature of A:

$$B = A^E \bmod N$$

If the smartcard is authentic, then the resulting signature, B, can be verified by using the smartcard's public key, D, by performing another modular exponentiation operation given as:

$$A = B^D \bmod N$$

In the RSA authentication scheme, the values of E and D are chosen such that the above equations are always true.

Another popular authentication algorithm known as an elliptic-curve cryptosystem can also be used for authentication purposes. An authentication scheme using elliptic curves is analogous to the RSA authentication, but instead of exponentiation, which is repeated multiplications, the elliptic-curve algorithm uses scalar point multiplication, which is repeated point additions. The elliptic-curve scheme also requires the use of a secret scalar, k, which is used to digitally sign messages.

In a smartcard system that uses modular exponentiation for authentication the value of E is stored in the memory of the smartcard's microprocessor and the modular exponentiation of A by E is performed in the smartcard's microprocessor. The secrecy of E is vital to the security of an authentication scheme. If E were revealed to a malicious attacker, then the security of the system would fail. The revelation of E would make it impossible to distinguish between the actual smartcard and an attacker possessing the secret E that is posing as the real smartcard. A similar argument can be made for protecting the secrecy of the scalar k in the elliptic-curve cryptosystem. Once the security of a tamper-resistant device, such as smartcards, has been breached and the secret exponent or scalar is known to an attacker, cloning smartcards, or theft of services/values from smartcards, becomes a real threat.

Unfortunately it can be shown that bits of E or k can be recovered by a malicious attacker using a Differential Power Analysis (DPA) attack. An attacker performing this attack on a smartcard can monitor the power consumption of the smartcard while the secret key, is being used to digitally sign a message. In the RSA cryptosystem, the secret E is used during the modular exponentiation operation and in an elliptic-curve cryptosystem, the secret k is used during the multiplication operation. In the RSA cryptosystem, the result of the modular exponentiation is obtained using a well-known algorithm called the square-and-multiply algorithm. In the elliptic-curve cryptosystem, the multiplication result is obtained using an analogous algorithm called the double-and-multiply algorithm. When the secret E is used by a smartcard during the square-and-multiply algorithm or the secret k is used by the double-and-multiply algorithm, the instantaneous power consumption can be monitored by an attacker. The attacker can use this power consumption information to learn the value of the secret.

A solution is therefore desired for mitigating or altogether eliminating the vulnerability of cryptographic elements that may possibly result by analysis of power variations, such as a cryptographic element revealing power consumption information that is correlated to the secret exponent.

DETAILED DESCRIPTION OF THE PREFERRED EMBODIMENTS

The present invention provides a randomized method and apparatus to perform the modular exponentiation function:

$$B = A^E \bmod N$$

in order to minimize or altogether eliminate power analysis attacks on microelectronic assemblies such as smartcards.

Figure 1:
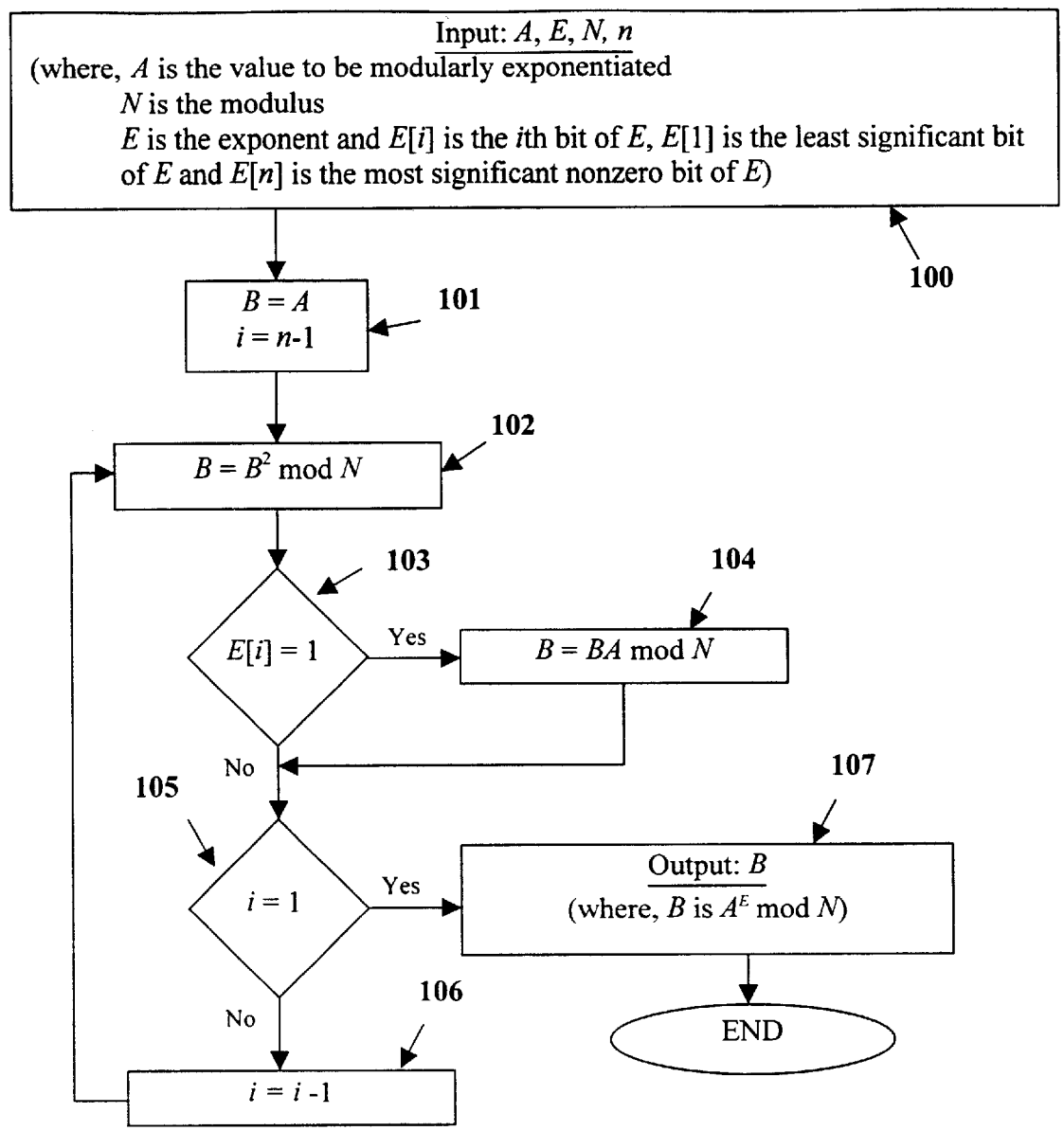
FIG. 1 represents a flowchart of a conventional modular exponentiation algorithm using the well-known square-and-multiply algorithm starting with the exponent's most significant bit.

A conventional non-random technique for performing modular exponentiation is to use a square-and-multiply algorithm. FIG. 1 represents a flowchart of a conventional modular exponentiation algorithm using the well-known square-and-multiply algorithm starting with the exponent's most significant bit. This right-going square-and-multiply algorithm starts with the exponent's most significant bit and proceeds towards the least significant bit. The algorithm illustrated in FIG. 1 begins in box 100, where the inputs to the algorithm, A, E, N and n are defined. The value represented by A is the value to be exponentiated. The value represented by N is the modulus. The value represented by E is the secret exponent and n is the number of bits in E. The next step in box 101 is to initialize the B variable to A and the i variable to n−1. The value represented by the i variable represents the bit number of E that is to be processed. Step 102 performs a modular square operation of the B variable and saves the result in B. Step 103 checks the ith bit of E and if it is a 1, then proceeds to step 104 and modularly multiplies B by A; otherwise step 104 is skipped. Next, step 105 checks to see if the i variable has reached 1, indicating the algorithm is finished. If i is not equal to 1, then the algorithm subtracts 1 from i at step 106 and goes back to step 102 and loops. If i is equal to 1, the algorithm goes to step 107 and outputs B, the final result.

Figure 2:
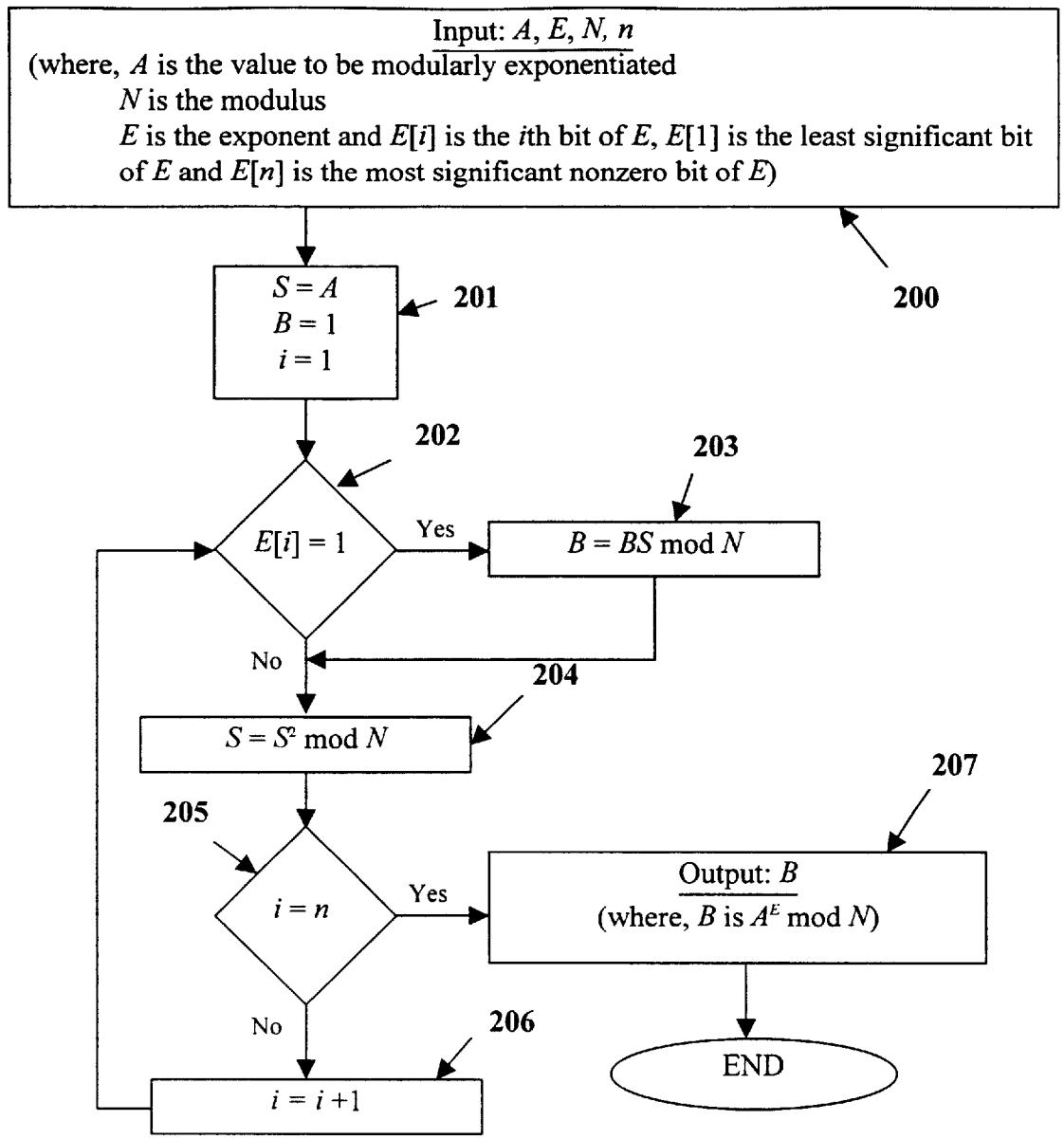
FIG. 2 represents a flowchart of a conventional modular exponentiation algorithm using the well-known square-and-multiply algorithm starting with the exponent's least significant bit.

FIG. 2 represents a flowchart of a conventional modular exponentiation algorithm using the well-known square-and-multiply algorithm starting with the exponent's least significant bit. This left-going version of the square-and-multiply algorithm works in the opposite direction of the algorithm in FIG. 1. In the conventional modular exponentiation represented in FIG. 2, the exponent's least significant bit is processed first rather than last. The algorithm of FIG. 2 begins at step 200, where the inputs to the algorithm, A, E, N and n are defined. The next step 201 is to initialize the B variable to 1, the i variable to 1 and a temporary storage S variable to A. Step 202 checks the ith bit of E and if it is a 1 goes to step 203 and modularly multiplies B by S; otherwise step 203 is skipped. Next, step 204 performs a modular square operation of the S variable and saves the result in S. Step 205 checks to see if the i variable has reached n, indicating the algorithm is finished. If i is not equal to n, then the algorithm adds 1 to i at step 206 and goes back to step 202 and loops. If i is equal to n, the algorithm goes to step 207 and outputs B, the final result.

Both of the above algorithms are susceptible to DPA attack because once a particular algorithm is implemented, the exponent secret bits are used in the same order every time. An attacker can emulate the exponentiation and determine where and when the exponent bits are being used. By monitoring the power consumption, the attacker can also learn the exact values of the exponent bits.

Figure 3:
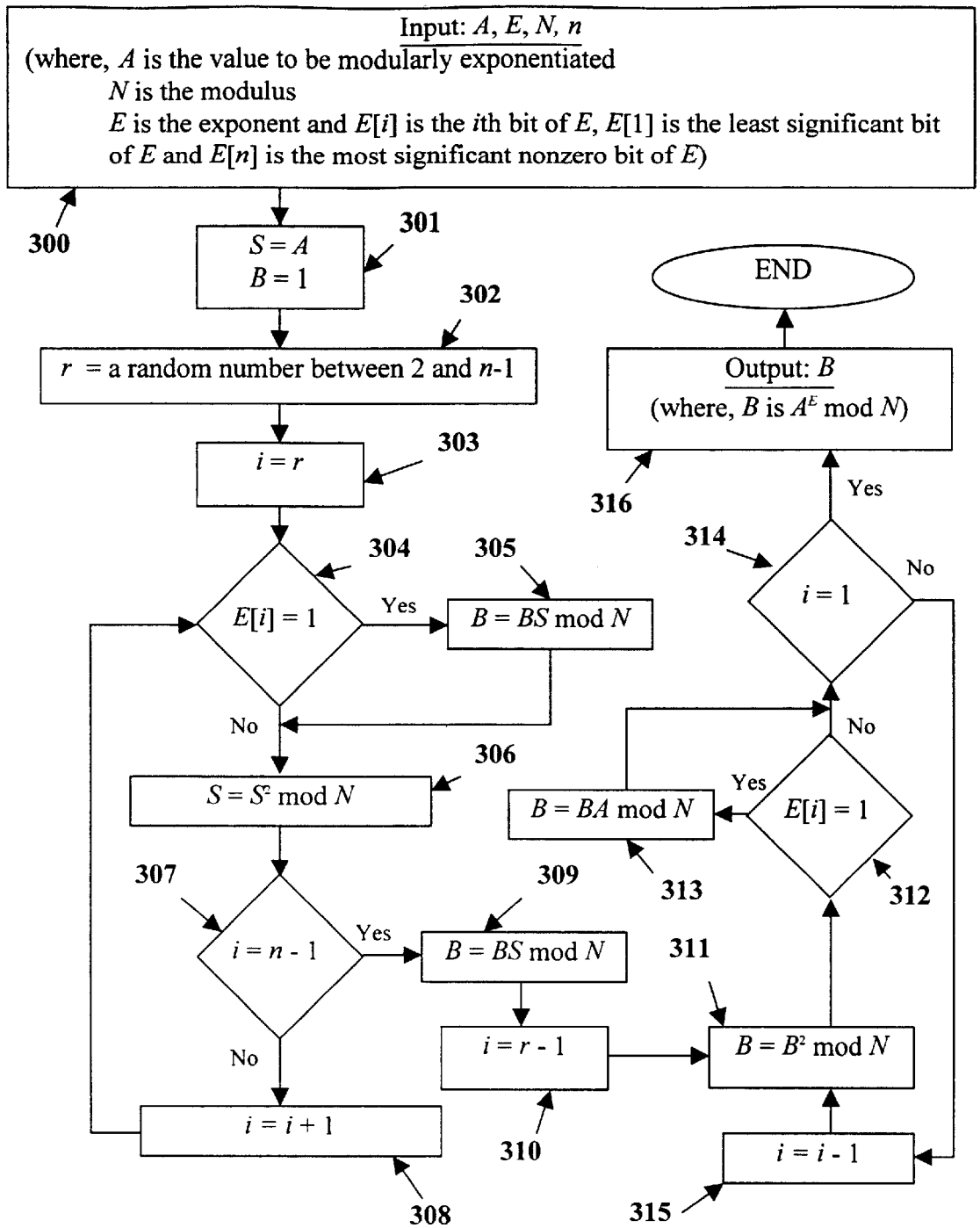
FIG. 3 represents a flowchart of steps of a preferred embodiment of the present invention.

The method according to the present invention provides for the randomization of the starting point of the modular exponentiation. This randomization obscures the measurements of an attacker measuring the power consumption making such an attack intractable. FIG. 3 represents a flowchart of steps of a preferred embodiment of the present invention.

An implementation of the steps of a method of the present invention as shown in FIG. 3 starts by choosing a random starting point in the exponent. Then, an implementation of the algorithm in FIG. 2 is used to exponentiate working leftwards from the random starting point until it reaches the most significant exponent bit. At this point the processing goes back to the random starting point and works rightwards to the least significant exponent bit using an implementation of the algorithm in FIG. 1. Since the starting point of the exponentiation is randomized, it is difficult for an attacker to detect when specific exponent bits are being used; thus the threat of a power analysis attack is reduced.

The steps of a method according to the present invention begin at step 300, where the inputs to the algorithm, namely A, E, N and n are defined. The next step 301 is to initialize the B variable to 1, and the S variable to A. Step 302 sets the r variable equal to a random number between 2 and n−1. Step 303 sets i equal to r. Step 304 checks the ith bit of E and if it is a 1 goes to step 305 and modularly multiplies B by S; otherwise step 305 is skipped. Next, step 306 performs a modular square operation of the S variable and saves the result in S. Step 307 checks to see if the i variable has reached n−1, indicating the algorithm is ready to go to the second half. If i is not equal to n−1, then the algorithm adds 1 to i at step 308 and goes back to step 304 and loops. If i is equal to n−1, then the algorithm goes to step 309 and modularly multiplies B by S and saves the result in B. Then, at step 310, the variable i is set to r−1 and the square-and-multiply continues by going to step 311. At step 311 the value of B is modularly squared. Step 312 checks the ith bit of E and if it is a 1 goes to step 313 and modularly multiplies B by A; otherwise step 313 is skipped. Next, step 314 checks to see if the i variable has reached 1, indicating the algorithm is finished. If i is not equal to 1, then the algorithm subtracts 1 from i at step 315 and goes back to step 311 and loops. If i is equal to 1, the algorithm goes to step 316 and outputs B, the final result.

The algorithm of the present invention illustrated in FIG. 3 is optimal in the sense that the number of multiplies and squares is the same as either of the conventional algorithms. The randomized algorithm is slightly more complex than the conventional algorithms, but performs the same number of multiplies and squares as the conventional algorithms. Since the squares and multiplies contribute by far the most to the running time, the present invention has essentially the same performance as the conventional methods.

Figure 4:
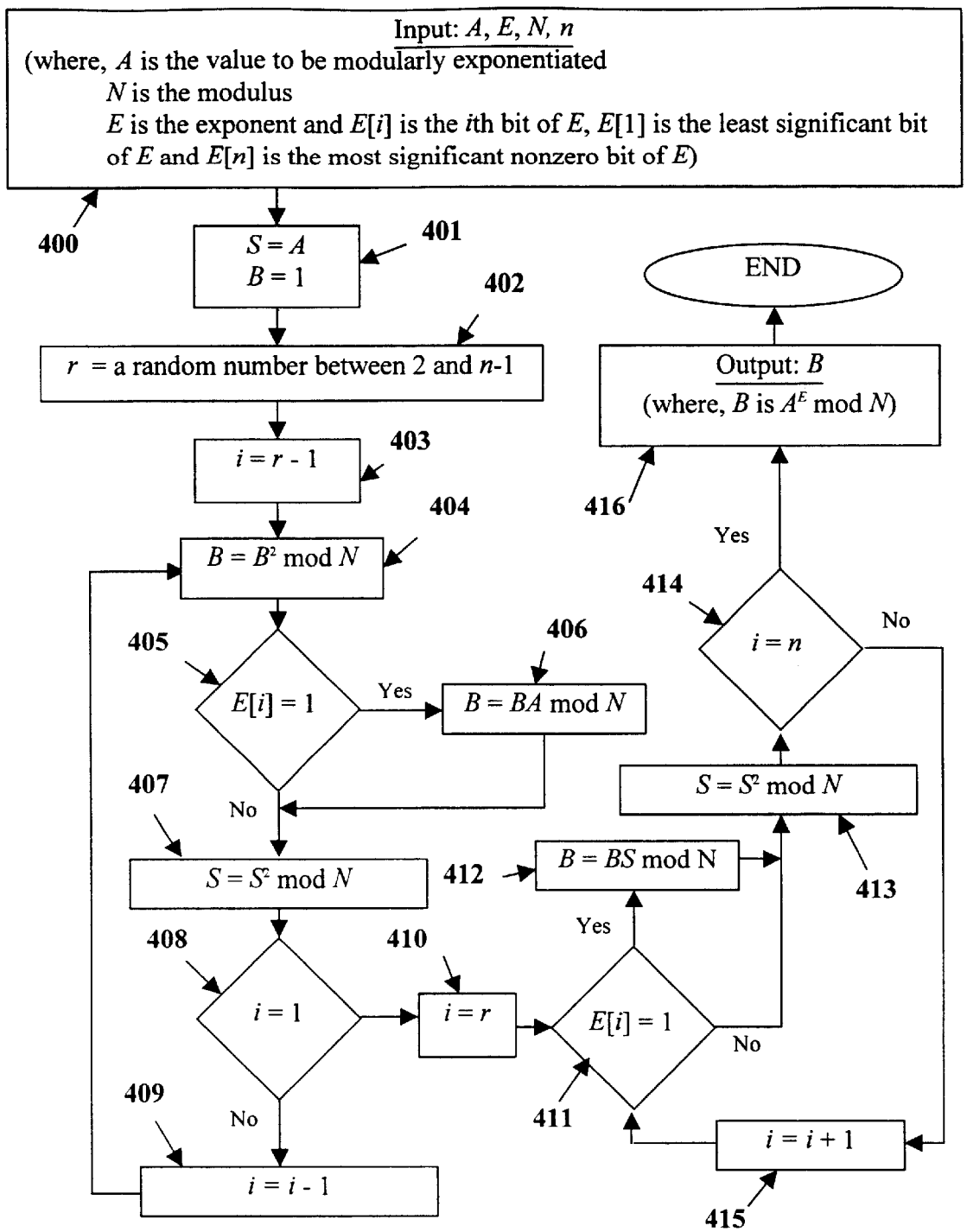
FIG. 4 represents a flowchart of a second embodiment of the present invention.

FIG. 4 represents a flowchart of a second embodiment of the present invention. The algorithm utilized in the method of the second embodiment of the present invention begins at step 400, where the inputs to the algorithm, A, E, N and n are defined. The next step 401 is to initialize the B variable to 1, and the S variable to A. Step 402 sets the r variable equal to a random number between 2 and n−1. Step 403 sets i equal to r. At step 404 the value of B is modularly squared. Step 405 checks the ith bit of E and if it is a 1 goes to step 406 and modularly multiplies B by A; otherwise step 406 is skipped. Next, step 407 modularly squares the S variable. Then, step 408 checks to see if the i variable has reached 1, indicating the algorithm is ready to go to the next half. If i is not equal to 1, then the algorithm subtracts 1 from i at step 409, goes back to step 404 and loops. If i is equal to 1, the algorithm goes to step 410 and the variable i is set to r and the square-and-multiply continues by going to step 411. Step 411 checks the ith bit of E and if it is a 1 goes to step 412 and modularly multiplies B by S; otherwise step 412 is skipped. Next, step 413 performs a modular square operation of the S variable and saves the result in S. Step 414 checks to see if the i variable has reached n, indicating the algorithm is finished. If i is not equal to n, then the algorithm adds 1 to i at step 415 and goes back to step 411 and loops. If i is equal to n, the algorithm goes to step 416 and outputs B, the final result.

Another solution to prevent a DPA attack on the exponentiation function is to use a random combination of the method of the preferred embodiment and the second embodiment of the present invention. When both algorithms can be used, then prior to performing an exponentiation, a random event would determine which algorithm would be used. The advantage of using both algorithms is to further obscure the power consumption monitoring capabilities of an attacker.

The randomized exponentiation algorithm can either be implemented in software or hardware. It can even be used in applications where the exponent is pre-coded, such as when two exponent bits are processed at a time. The method according to the present invention can be utilized with a randomized double-and-add algorithm. Such an algorithm could be used to make elliptic curve cryptosystems resistant to power analysis attacks.

In an elliptic-curve cryptosystem the digital signatures are performed on points of an elliptic curve. The digital signature of a point, P on an elliptic curve is obtained by multiplying P by a secret scalar k to obtain another point Q on the elliptic curve. The point Q can be used as the digital signature of point P. The following equation represents the formula used for a digital signature scheme using elliptic curve scalar multiplication:

$$Q=kP$$

In an elliptic-curve cryptosystem, the elliptic-curve scalar multiplication operation is performed using a double-and-add algorithm that is analogous to the square-and-multiply algorithm.

Figure 5:
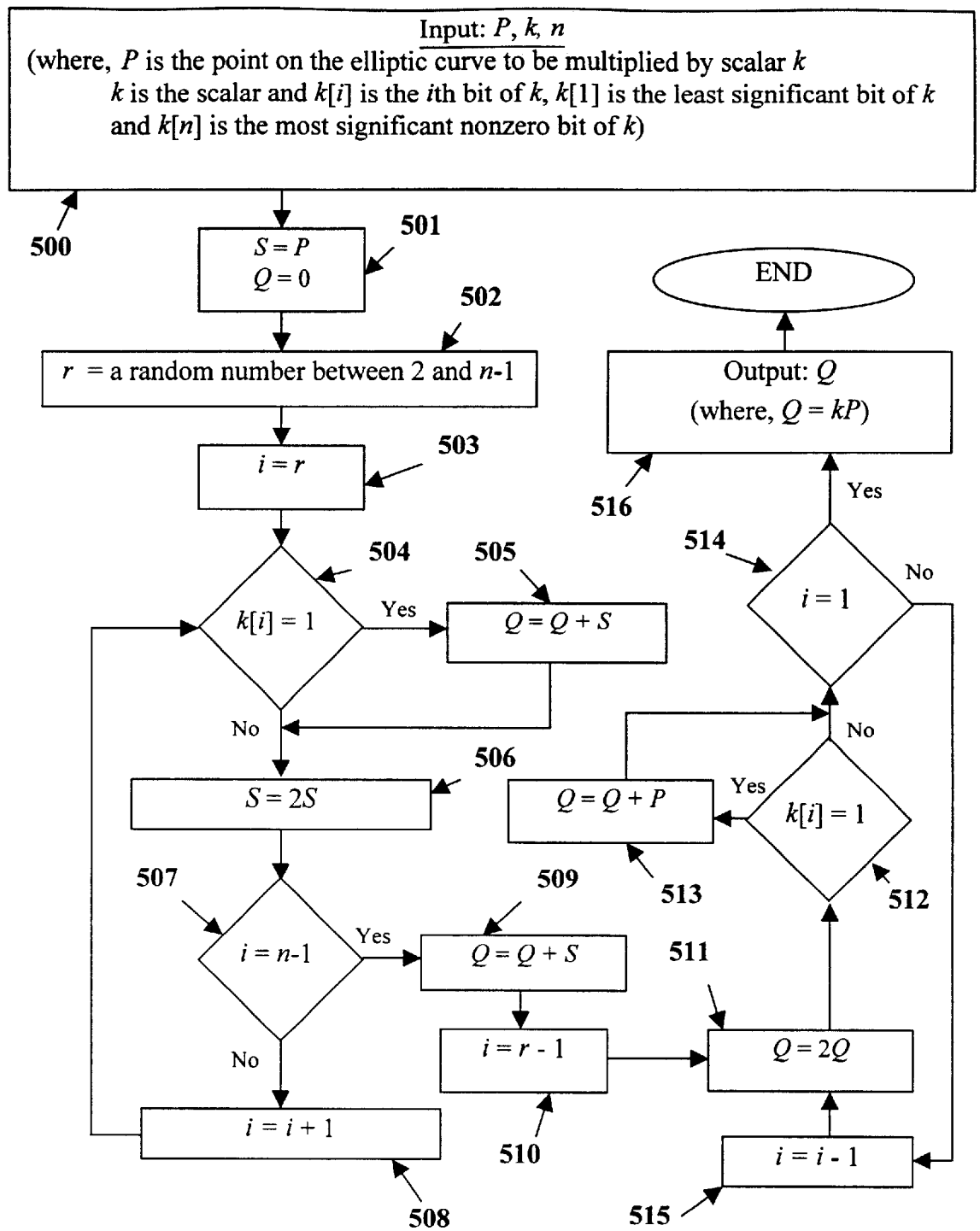
FIG. 5 represents a flowchart of a third embodiment of the present invention.

FIG. 5 represents a flowchart of a third embodiment of the present invention. As shown in FIG. 5, the first step of the method according to the third embodiment of the present invention begins in box 500, where the inputs to the algorithm, P, k and n are defined. The input variable P is the point on the elliptic-curve that represents the value to be signed, k is the secret scalar and n is the number of bits in k. The next step 501 is to initialize the Q variable to equal the identity point 0, and the S variable to point P. Step 502 sets the r variable equal to a random number between 2 and n−1. Step 503 sets i equal to r. Step 504 checks the ith bit of k and if it is a 1 goes to step 505 and performs an elliptic-curve point addition of Q and S and saves the result in Q; otherwise step 505 is skipped. Next, step 506 performs an elliptic-curve double operation of the S variable and saves the result in S. Step 507 checks to see if the i variable has reached n−1, indicating the algorithm is ready to go to the second half. If i is not equal to n−1, then the algorithm adds 1 to i at step 508 and goes back to step 504 and loops. If i is equal to n−1, then the algorithm goes to step 509 and performs an elliptic-curve point addition of Q and S and saves the result in Q. Then at, at step 510, the variable i is set to r−1 and the double-and-add continues by going to step 511. At step 511 the elliptic-curve point Q is doubled. Step 512 checks the ith bit of k and if it is a 1 goes to step 513 and performs an elliptic-curve point addition of Q and P and saves the result in Q; otherwise step 513 is skipped. Next, step 514 checks to see if the i variable has reached 1, indicating the algorithm is finished. If i is not equal to 1, then the algorithm subtracts 1 from i at step 515 and goes back to step 511 and loops. If i is equal to 1, the algorithm goes to step 516 and outputs Q, the final result.

Figure 6:
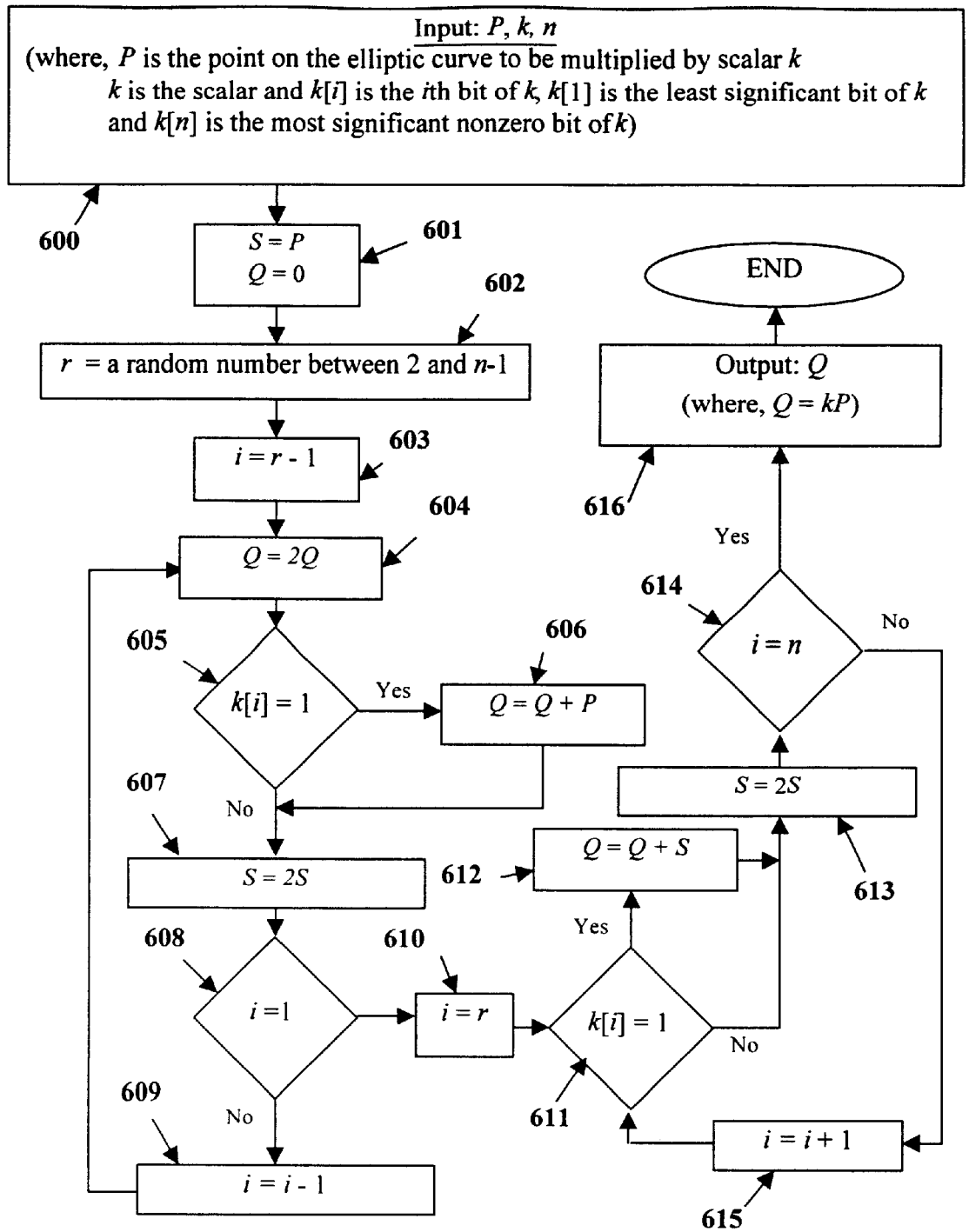
FIG. 6 represents a flowchart of a fourth embodiment of the present invention.

FIG. 6 represents a flowchart of a fourth embodiment of the present invention. As shown in FIG. 6, the first step of the method according to the fourth embodiment of the present invention begins in box 600, where the inputs to the algorithm, P, k and n are defined. The next step 601 is to initialize the Q variable to the identity point 0, and the S variable to P. Step 602 sets the r variable equal to a random number between 2 and n−1. Step 603 sets i equal to r−1. At step 604 the elliptic-curve point Q is doubled. Step 605 checks the ith bit of k and if it is a 1 goes to step 606 and performs an elliptic-curve point addition of Q and P and saves the result in Q; otherwise step 606 is skipped. Next, step 607 performs an elliptic-curve double operation of the S variable and saves the result in S. Then, step 608 checks to see if the i variable has reached 1, indicating the algorithm is ready to go to the next half. If i is not equal to 1, then the algorithm subtracts 1 from i at step 609, goes back to step 604 and loops. If i is equal to 1, the algorithm goes to step 610 and the variable i is set to r and the double-and-add continues by going to step 611. Step 611 checks the ith bit of k and if it is a 1 goes to step 612 and performs an elliptic-curve point addition of Q and S and saves the result in Q, otherwise step 612 is skipped. Next, step 613 performs an elliptic-curve double operation of the S variable and saves the result in S. Step 614 checks to see if the i variable has reached n, indicating the algorithm is finished. If i is not equal to n, then the algorithm adds 1 to i at step 615 and goes back to step 611 and loops. If i is equal to n, the algorithm goes to step 616 and outputs Q, the final result.

The randomized double-and-add algorithm can either be implemented in software or hardware. It can even be used in applications where the scalar k is pre-coded, such as when two scalar bits are processed at a time.

Figure 7:
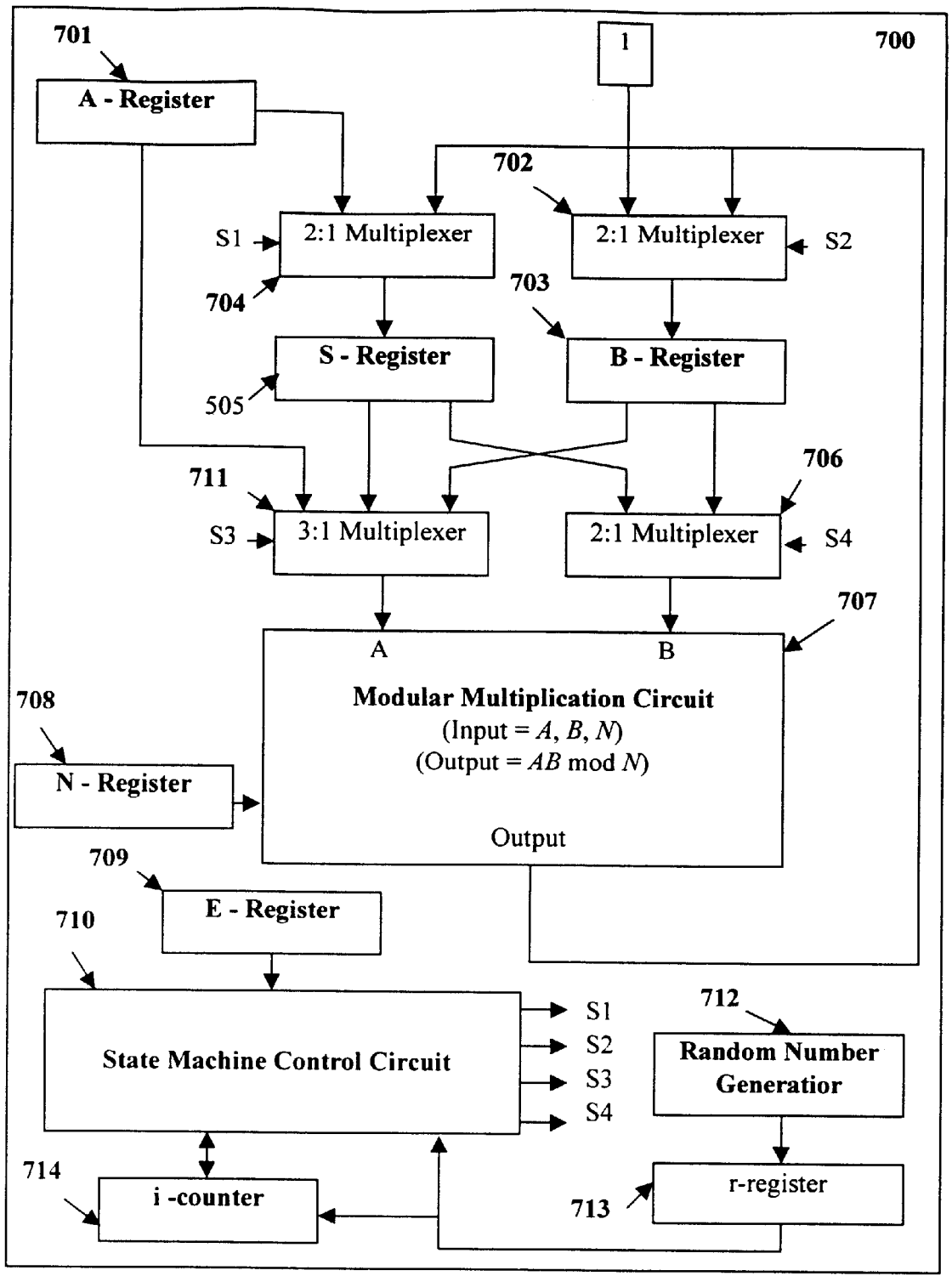
FIG. 7 represents a block diagram of an apparatus in accordance with the present invention.

FIG. 7 represents a block diagram of an apparatus in accordance with the present invention. A state machine control circuit 710 is used to effect the present invention. The first step is to initialize the S-register 705 and the B-register 703. The state machine control circuit uses the 2:1 multiplexers 704 and 702 to select the A-register and select the number 1 to be input into the S-register 705 and the B-register 703, respectively. Next, the state machine 710 activates the random number generator 712 and gets a random value between 1 and n. This random value gets saved in the r-register 713. The state machine 710 now controls the randomized exponentiation algorithm by repeatedly using the modular multiplication circuit 707. The modulus used by the multiplication circuit 707 is stored in the N-register 708. The other inputs to multiplication circuit 707 are chosen using the 3:1 multiplexer 711 and the 2:1 multiplexer 706. The E-register 709 is used to store the bits of the exponent. The state machine reads the values of the bits in register 709 and decides which values to input into the modular multiplication circuit 707. The state machine 710 follows the algorithm described above and in the flowchart represented in FIG. 3 to decide which inputs to direct into the multiplication circuit 707. The state machine 710 uses the i-counter register 714 to keep track of which step in the algorithm is being executed. The i-register 714 is initialized with the value from the r-register 713 and is updated according to the algorithm.

The data registers in FIG. 7 labeled 701, 703, 705, 708, 709 and 713 can be implemented using conventional registers made with logical gates, or can be implemented in random-access memory or a combination of the two. The random number generator 712 can be implemented using a hardware device or a software routine. The modular multiplication circuit 707 can be implemented using conventional means.

Figure 8:
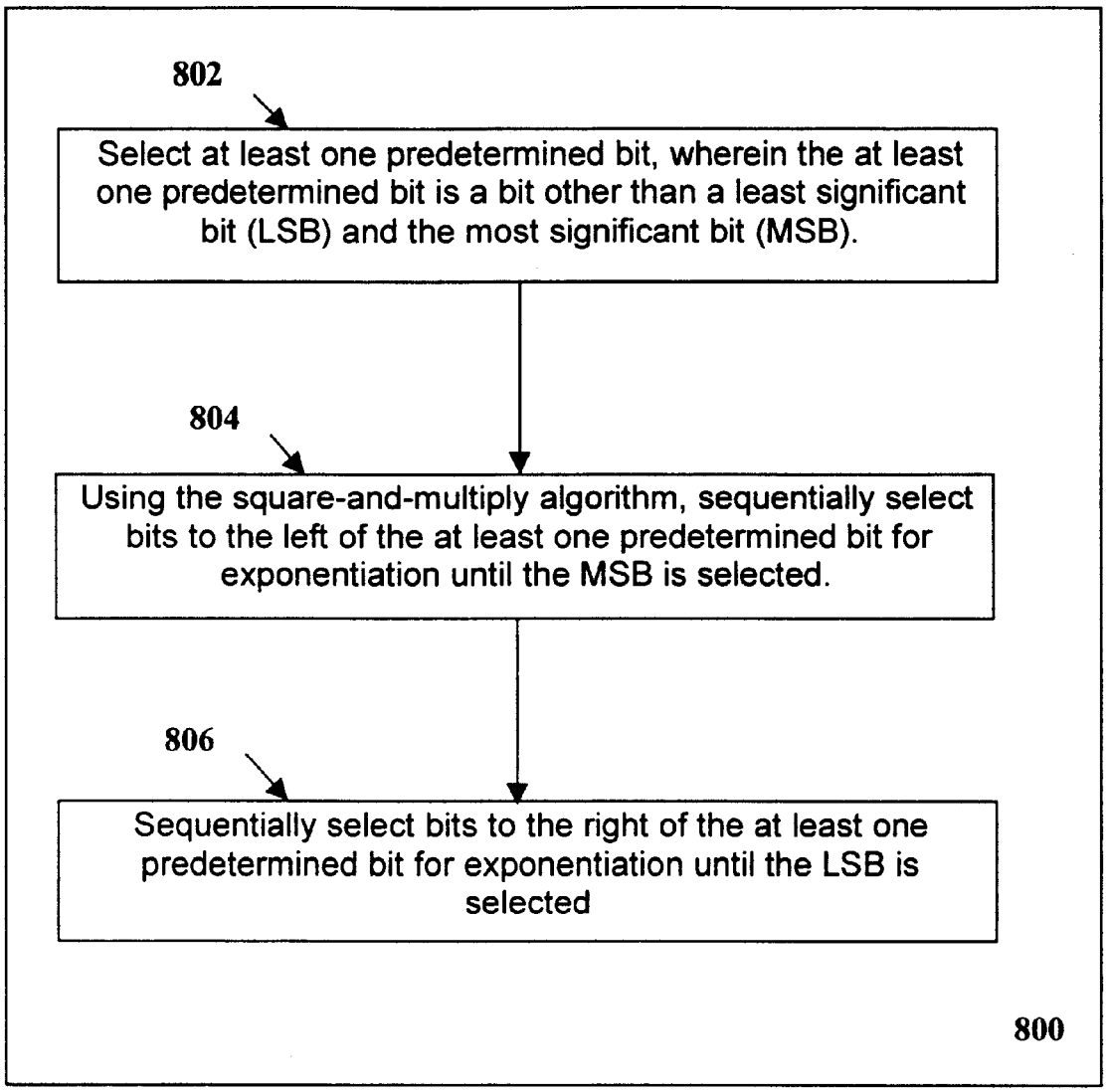
FIG. 8 represents the steps of the method according to the preferred embodiment of the present invention.

The apparatus 700, in accordance with the present invention can be in the form of a microelectronic assembly including an integrated circuit for execution of an embedded modular exponentiation program utilizing a square-and-multiply algorithm, wherein in the modular exponentiation program a secret exponent having a plurality of bits characterizes a private or secret key. The apparatus provides a digital signature by performing the steps of a method (800) described below (and illustrated in FIG.8) to prevent the detection of secret exponent when the power variations during the IC execution is monitored. As a first step, for a first operation in the modular exponentiation, at least one predetermined bit is selected (802), wherein the at least one predetermined bit is a bit other than a least significant bit (LSB) and the most significant bit (MSB). Then using the square-and-multiply algorithm, sequentially bits to the left of the at least one predetermined bit are selected (804) for exponentiation until the MSB is selected. And subsequent to selecting the MSB, sequentially bits to the right of the at least one predetermined bit are selected (806) for exponentiation until the LSB is selected.

It should be noted that the apparatus according to the present invention implements all of the embodiments of the present invention described above and illustrated in FIGS. 3 through 6. The microelectronic assembly according to the present invention can be a smartcard and the integrated circuit can be a microcontroller. Moreover, the microcontroller contemplated in the present invention is an HC05-based or an ARM-based controller, although other appropriate types of microcontrollers can be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

We claim:

1. In a microelectronic assembly including an integrated circuit (IC) for execution of an embedded modular exponentiation program, wherein in the modular exponentiation program a secret exponent having a plurality of bits characterizes a private key, a method of providing a digital signature to prevent the detection of the secret exponent when monitoring power variations during IC execution, the method comprising the steps of:

selecting at least one predetermined bit in the secret exponent, wherein the at least one predetermined bit is a bit other than a least significant bit (LSB) and a most significant bit (MSB);

using a first algorithm, sequentially selecting bits to the left of the at least one predetermined bit for exponentiation until the MSB is selected; and using a second algorithm, subsequent to selecting the MSB, sequentially selecting bits to the right of the at least one predetermined bit for exponentiation until the LSB is selected, wherein the first algorithm is different from the second algorithm.

2. The method of claim 1, wherein the microelectronic assembly is a smartcard and the IC is a microcontroller.

3. The method of claim 2, wherein the microcontroller is an HC05-based microcontroller.

4. The method of claim 1, wherein the modular exponentiation program is executed in hardware.

5. In a microelectronic assembly including an integrated circuit (IC) for execution of an embedded modular exponentiation program, wherein in the modular exponentiation program a secret exponent (E) having a plurality of bits characterizes a private key, a method of providing a digital signature to prevent the detection of the secret exponent when monitoring power variations during the IC execution, the method comprising the steps of:

selecting at least one predetermined bit in the secret exponent, wherein the at least one predetermined bit is a bit other than a least significant bit (LSB) and a most significant bit (MSB);

using a first algorithm, sequentially selecting bits to the right of the at least one predetermined bit for exponentiation until the LSB is selected; and using a second algorithm, subsequent to selecting the LSB, sequentially selecting bits to the left of the at least one predetermined bit for exponentiation until the MSB is selected, wherein the first algorithm is different from the second algorithm.

6. The method of claim 5, wherein the microelectronic assembly is a smartcard and the IC is a microcontroller.

7. The method of claim 6, wherein the microcontroller is an ARM-based microcontroller.

8. The method of claim 5, wherein the modular exponentiation program is executed in hardware.

9. In a microelectronic assembly including an integrated circuit (IC) for execution of an embedded elliptic-curve scalar multiplication program, wherein in the elliptic-curve scalar multiplication program a secret scalar having a plurality of bits characterizes a private key, a method of providing a digital signature to prevent the detection of the secret scalar when monitoring power variations during the IC execution, the method comprising the steps of:

selecting at least one predetermined bit in the secret scalar, wherein the at least one predetermined bit is a bit other than a least significant bit (LSB) and a most significant bit (MSB);

using a first algorithm, sequentially selecting bits to the left of the at least one predetermined bit for scalar multiplication until the MSB is selected; and using a second algorithm, subsequent to selecting the MSB, sequentially selecting bits to the right of the at least one predetermined bit for scalar multiplication until the LSB is selected, wherein the first algorithm is different from the second algorithm.

10. The method of claim 9, wherein the microelectronic assembly is a smartcard and the IC is a microcontroller.

11. The method of claim 10, wherein the microcontroller is an HC05-based microcontroller.

12. The method of claim 9, wherein the elliptic-curve scalar multiplication program is executed in hardware.

13. In a microelectronic assembly including an integrated circuit (IC) for execution of an embedded elliptic-curve scalar multiplication program, wherein in the elliptic-curve scalar multiplication program a secret scalar having a plurality of bits characterizes a private key, a method of providing a digital signature to prevent the detection of the secret scalar when monitoring power variations during the IC execution, the method comprising the steps of:

selecting at least one predetermined bit in the secret scalar, wherein the at least one predetermined bit is a bit other than a least significant bit (LSB) and a most significant bit (MSB);

using a first algorithm, sequentially selecting bits to the right of the at least one predetermined bit for scalar multiplication until the LSB is selected; and using a second algorithm, subsequent to selecting the LSB, sequentially selecting bits to the left of the at least one predetermined bit for scalar multiplication until the MSB is selected, wherein the first algorithm is different from the second algorithm.

14. The method of claim 13, wherein the microelectronic assembly is a smartcard and the IC is a microcontroller.

15. The method of claim 14, wherein the microcontroller is an ARM-based microcontroller.

16. The method of claim 13, wherein the elliptic-curve scalar multiplication program is executed in hardware.

17. The method of claim 1, wherein at least one of the first and second algorithms is a square-and-multiply algorithm.

18. The method of claim 5, wherein at least one of the first and second algorithms is a square-and-multiply algorithm.

19. The method of claim 9, wherein at least one of the first and second algorithms is a double-and-add algorithm.

20. The method of claim 13, wherein at least one of the first and second algorithms is a double-and-add algorithm.

* * * * *